Sept. 13, 1960  E. WILDHABER  2,952,216
ROTARY SCREW UNIT FOR DISPLACING FLUID
Filed March 13, 1956  2 Sheets-Sheet 1

INVENTOR.
ERNEST WILDHABER
BY
ATTORNEY

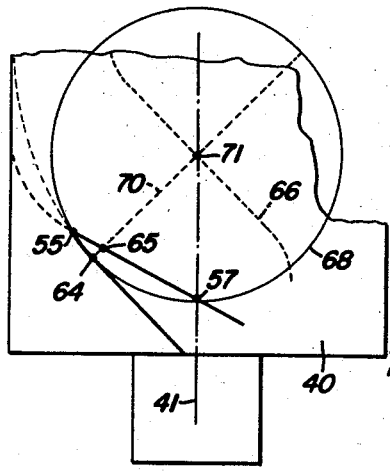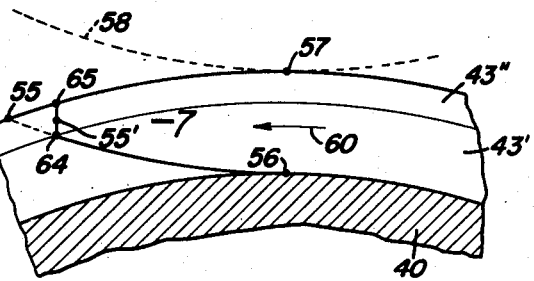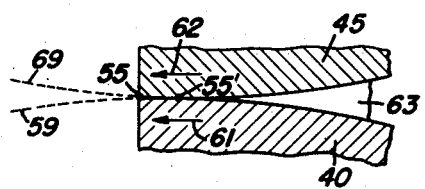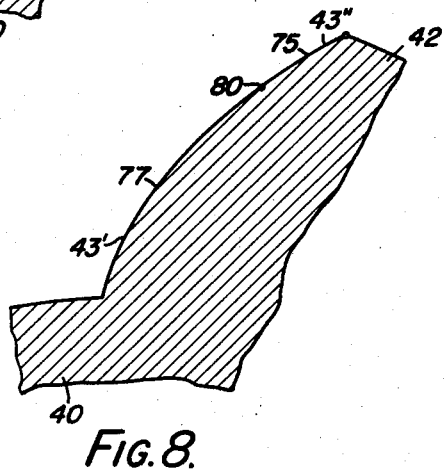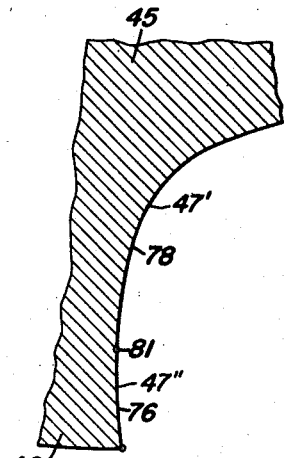
INVENTOR.
ERNEST WILDHABER

United States Patent Office 2,952,216
Patented Sept. 13, 1960

2,952,216
ROTARY SCREW UNIT FOR DISPLACING FLUID

Ernest Wildhaber, 124 Summit Drive, Rochester, N.Y.

Filed Mar. 13, 1956, Ser. No. 571,297

11 Claims. (Cl. 103—128)

The present invention relates to rotary screw units for transmitting power to or receiving it from a fluid, whether an incompressible fluid, such as most liquids, or a compressible fluid, such as air, gases, some liquids, etc. In a more specific aspect, the present invention relates to rotary screw pumps and motors.

In conventional screw pumps and motors, the mating screws are often connected together to be driven in time with one another by timing gears. One known way of avoiding separate timing gears consists in providing sharply curved thread portions in the immediate vicinity of the pitch cylinders of the screws. The purpose is to transmit moderate load in the vicinity of the pitch cylinders, where relative sliding is small. These sharply curved portions are, however, very sensitive to even very small relative displacements of the turning axes; and they also complicate manufacture.

One object of the present invention is to provide a screw pump in which the use of separate timing gears is eliminated in a practical and novel manner, and in which the turning motion of one screw is controlled directly by the other screw.

Other objects of the invention are to provide more rugged, less delicate, thread surfaces for the screws than those now in use, and thread surfaces less sensitive to deflection and misalignment.

Still other objects of the invention will be apparent hereinafter from the specification and from the recital of the appended claims.

In the drawings:

Fig. 5 is a fragmentary, diagrammatic plan view of the lower screw of Fig. 4, further illustrating the invention;

Fig. 6 is a fragmentary view taken normal to the thread surface of the lower screw of Fig. 4 and at right angles to its mean helix;

Fig. 7 is a fragmentary normal section through contacting thread surfaces taken along the line 7—7 of Fig. 6; and Figs. 8 and 9 are fragmentary normal sections on an enlarged scale taken through the two mating thread surfaces, respectively, of the screws of Fig. 4 and taken at right angles to the pitch helices of the screws.

In a unit constructed according to the present invention, there is provided a pair or more of intermeshing screws which are rotatably mounted on parallel axes and which are enclosed in a casing. The screws turn in proportion so that the two cylindrical pitch surfaces of the mating screws roll on each other without sliding. One of the mating screws has convex thread profiles disposed principally on the outside of its pitch cylinder; and the other of the mating screws has concave thread profiles disposed principally on the inside of its pitch cylinder. The fluid travels axially of the screws between regions of different pressure.

Figure 1:
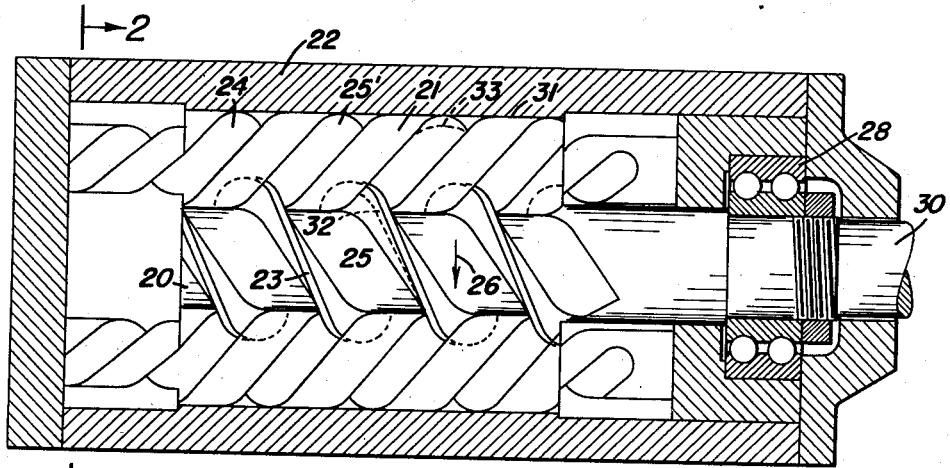
Fig. 1 is an axial section taken through one form of screw pump or hydraulic motor built according to one embodiment of this invention and comprising double-thread screws whose thread surfaces are constructed according to this invention.

In Figs. 1 and 2, 20, 21, and 21' denote three screws rotatably mounted on parallel axes in a casing 22. The two screws 21, 21' interengage with the screw 20 at opposite sides of the axis of the screw 20. The screws 21 and 21' are identical in construction, and their mesh with screw 20 is the same. The screw rotor 20 has helical threads 23 of convex profile on opposite sides, while the screws 21, 21' have helical threads 24, which mate with threads 23 and which are of concave profile on opposite sides. The screws 21, 21' are of reduced diameter adjacent both ends, as shown in Fig. 1 and bear at both ends against the ends of the casing. The screw 20 is journaled at one end on the antifriction bearing 28 which holds it axially in both directions.

Pockets or chambers 25 in the screw 20, and 25' in the screws 21, 21' are formed by the interengaging threads and the inside surface of the casing 22. These pockets move axially to the left of the screws as the screws rotate, when the screw rotor 20 turns in the direction of the arrow 26. Fluid is then displaced from right to left. When the unit acts as a pump, a region of increased pressure is formed at the left, which is the region to which the fluid is moved. An outlet 27 (Fig. 2) is provided there. An inlet (not shown) is provided at the opposite end of the casing.

Drive is applied to shaft 30 of screw rotor 20. The screws 21 and 21' may be mounted in the casing 22 directly on their cylindrical outside surfaces 31, 31'. There are no separate timing gears between the screws 20, 21 and 21'. This is done without using sharply curved thread portions in the immediate vicinity of the pitch cylinders.

With the present invention a different design principle is employed. Rather than try to secure minimum relative sliding, the thread surfaces themselves are strengthened so that they can stand some sliding without harm. At the same time, more rugged and less sensitive shapes are attained, and shapes that present less difficulty to accurate manufacture.

In accordance with the present invention, the outer portions 32, 33, 33', of the threads 23 and 24 are modified, so that they no longer have mere edge contact. These outer portions are made to mesh with each other with tangential contact in the manner of gears. This contact enables them to transmit enough torque to do without timing gears. The structure will be described in detail with reference to Figs. 4 to 9 inclusive.

My novel outer thread portions may be used on both sides of both screws of a pair as shown, or they may be used at least on one side of a pair of mating screws, that is, on the sides engaged in driving contact.

Figure 2:
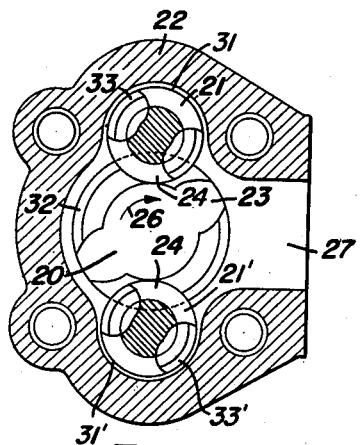
Fig. 2 is a section along the line 2—2 of Fig. 1 looking in the direction of the arrows.
Figure 3:
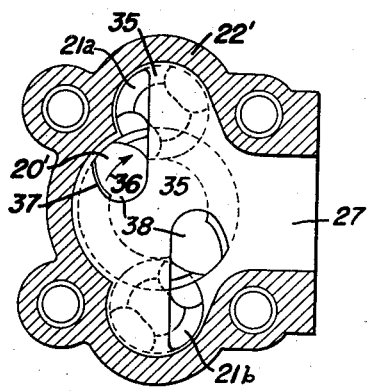
Fig. 3 is a section similar to Fig. 2 but showing specifically one way in which the invention may be adapted to a compressor, or to a motor, for a compressible medium such as air or gases.
Figure 4:
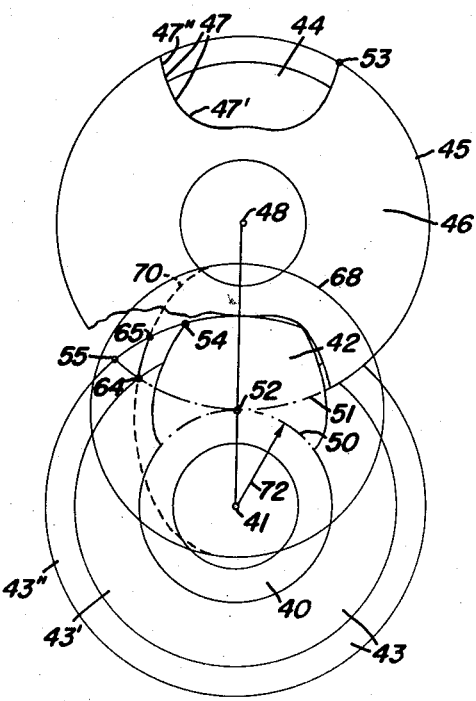
Fig. 4 is an end view illustrating diagrammatically the thread-shape of screws made according to the invention and showing a pair of screw-shaped rotors constructed according to the invention, one rotor being a single-thread screw and the other a double-thread screw, the view being taken looking in the direction of the axes of the rotors.

In all cases, I may use either a single pair of screws, as indicated in Fig. 4, or more than two screws, as shown in Figs. 1 to 3. I may use single screws, as shown, or I may use double screws, each consisting of a pair of coaxial screws of opposite hand. The invention resides in the thread surfaces not in any specific arrangement. In Figs. 1, 2 and 3 I have illustrated double thread screws. In Figs. 4 to 9 inclusive I have shown a single thread screw in mesh with a double thread screw; but the principle underlying the structure of the thread surfaces is the same regardless of the number of threads or starts in the screws and Figs. 4 to 9 inclusive illustrate, therefore, the basic structure of the multi-thread screws of Figs. 1 to 3 inclusive as well as the actual structure of the screws shown in Figs. 4 to 9.

Referring now to Figs. 4 to 9, the screw rotor 40 has a helical thread 42 whose opposite side surfaces 43 have convex profiles. The thread 42 engages in helical grooves 44 of screw 45 whose thread is denoted at 46. Sides 47 of the thread 46 have concave profiles. The screws 40 and 45 are rotatably mounted on parallel axes 41 and 48, respectively.

In operation, the two screws 40, 45 turn at a constant ratio on their axes at the inverse ratio of their numbers of threads. Thereby the cylindrical pitch surfaces of the two screws, which are represented by the circles 50 and 51, that contact at 52, as in gearing, roll on each other without sliding.

The helical sides 43 and 47 of the threads of the two screws each consists of two portions. The inner portions 43', 47' of each side of each thread are of conventional shape, while the outer portions 43", 47" of the threads are of novel shape. The outer portions occupy less than half of the radial depth of each side of each thread.

The inner portion 43' of screw 40 is a helicoid about the axis 41, such as may be described by a helical outside edge of the mating screw 45 when said edge is moved helically about the axis 41. The helix, which passes through the point 53 (Fig. 4), is one such edge. It lies in the pitch surface 51 of screw 45. The profile of the helical portion 43' is a cycloid, specifically an epicycloid, in a plane section perpendicular to axis 41, as known.

The inner portion 47' of the thread side 47 is a helicoid about the axis 48, such as may be described by a helical outside edge of the mating screw rotor 40 when said edge is moved helically about the axis 48. The helix passing through point 54 is one such edge.

The screws 40 and 45 touch each other at the inner thread portions 43', 47' along said helical edges, which thus form sealing lines separating the moving pockets.

It is known that screw units with axial fluid displacement should have rotors designed with sealing lines that pass through the intersection 55 of their extended outside surfaces, to avoid leakage.

Fig. 6 shows the sealing line on a thread side of a rotor 40. When the invention is not used, and the sides of the threads 43, 44, respectively, are constructed in conventional manner and have for their full depths continuations of the profiles of the inner portions 43', 47' of these thread sides, the sealing line between the mating thread sides is 56—55—57. It comes to a sharp point at 55 and has a general V-shape. 55—56 is the outside helix of the mating screw 45 whose bottom helix is indicated in dotted lines at 58. 55—57 is the outside helix of the shown thread surface of screw 40. It contacts the mating thread.

At point 55 the two contacting surfaces have a common tangent plane, and true geometrical contact exists. At other points of line 55—56 the tangent planes to the mating thread sides are inclined to one another and form an angle. This angle increases with increasing distance from point 55. There is no tangential contact. The same is true along the line 55—57.

On a pump or compressor, the lower rotor 40 (Fig. 4) drives the upper screw rotor 45. When the rotor 40 turns in counterclockwise direction, its thread surface 43 moves from right to left in Fig. 6 relative to the sealing line 56—55—57, in the direction of arrow 60. The mating thread surface moves in nearly the same direction. The two surfaces more or less roll on each other as indicated in Fig. 7. They can be considered to turn about their curvature centers at any instant in the direction of the arrows 61, 62.

If only one of them turns, and the other stands still, fluid pressure will be built up in the wedge 63 (Fig. 7) as is readily apparent. This effect is increased when both surfaces are moving in the direction of the arrows 61, 62. Still more pressure is then built up in the wedge and in the pocket or V 56—55—57. The pressure in some cases is sufficient to drive the other screw 45 of the pair even without full physical contact. In these cases there is a minute separation between the surfaces; and no wear occurs despite relative sliding under load.

A chief purpose of the present invention is to bolster this condition and to add tangential contact, to make the unit safe without timing gears, and well capable of taking the starting loads, and without appreciably adding to the leakage.

To this end, I have modified the shapes of the thread profiles of the mating thread sides of the screws so as to modify the general V-shape of the sealing lines 56—55—57, cutting off the point 55 of the V by a line 64—65 of true geometrical contact. At each point of line 64—65, the mating surfaces are constructed so that they contact each other tangentially, so as to have common tangent planes.

The sealing line pattern is now of truncated V-shape having a base 64—65 (Fig. 6) and helix portions 64—56 and 65—57. At point 64 of the helix portion 64—56 tangential contact exists between the mating surfaces, as at all points of the line 64—65. At other points of portion 64—56 the mating surfaces form an angle increasing with increasing distance from point 64. The same holds for helix portions 65—57, where tangential contact exists only at point 65.

At all points of line 64—65 the contact between the mating outer thread portions is intimate. It can be expressed in terms of relative curvature, which is the sum of the reciprocals of the curvature radii. The relative curvature in sections perpendicular to the line of contact 64—65 is very small.

Such a section is shown in Fig. 7 with the curvatures shown exaggerated. The actual curvature circles 59, 69 have larger radii than shown. The relative curvature is much smaller than it could be near the pitch surfaces. The decrease of relative curvature adds to the strength of the contacting surfaces. It is also a factor in keeping leakage down.

At point 55 (Fig. 7) the thread surfaces have now a small separation $z$ from each other because of the distance $e$ from the line of contact 64—65 ($e=55$—$55'$ in Fig. 6). The separation $z$ at point 55 is proportional to the relative curvature, and proportional to the square of the distance $e$.

Leakage can occur in the region between point 55 and the line of contact 64—65. Since there is tangential contact at said line, the leakage area can be shown to amount to:

$$\frac{z.e}{3}$$

in close approximation.

Thus when $z=0.003''$ and $e=0.20''$, the leakage area is equal to a rectangle of a length $e$ and of a height of $0.001''$. The improved thread side construction of the present invention, then, does not add materially to the leakage, but it adds very materially to the durability of the thread surfaces.

A preferred form of outer thread surface is attained by using a profile portion 64—65 that is a circular arc lying in a section normal to the helix described by its center. This helix 66 (Fig. 5) lies on the pitch surface 50 (Fig. 4), or approximately so. Gearing of this kind is described in my expired Patent No. 1,601,750, granted October 5, 1926.

The outer thread portion 43" of each side of screw rotor 40 then lies in and is part of the outside surface of a helical tube, such as may be mathematically enveloped by a sphere 68 (Fig. 5) whose center 71 moves on helix 66 about the axis 41 of the screw rotor 40. The arc 64—65 is part of great circle 70 of sphere 68.

The outer thread portion 47" (Fig. 4) of each side of the mating screw 21 then lies in the inside surface of a helical tube, such as may be enveloped by a sphere whose center moves in a helix along axis 48. This helix lies on the pitch surface 51 or approximately so.

The outer thread portions 43", 47" contact along an arc 64—65 that is part of a great circle of the sphere 68 centered at 71. The contact along said arc is very intimate tangential contact. Since arc 64—65 is common to both outer thread portions 43" and 47", their arcuate profiles have equal length.

The radius of arc 64—65 and of the sphere 68 is preferably kept at least as large as the pitch radius 72 of the screw rotor which has convex profile, that is, of the screw rotor 40. The line of contact 64—65 is kept in the vicinity of the intersection line 55 (Fig. 4) of the extended outside surfaces of the two screws, to confine leakage. Preferably the distance of line 64—65 from said intersection line is kept less than half the depth of the thread.

The sections shown in Figs. 8 and 9 are taken at right angles to the pitch helix 66 in Fig. 5 in the plane of the circular arcuate profiles 64—65. The radius of the convex arc 75 of outer profile portion 43" of screw 40 is equal to the radius of the concave arc 76 of outer profile portion 47" of screw 45, or very slightly smaller. The convex arc 75 joins the profile 77 of the inner thread portion 43' tangentially at 80 with a change of profile curvature. At the junction 80 the arc 75 is more curved than the profile 77. That is, the radius of arc 75 is smaller than the curvature radius at 80 of curve 77.

Likewise the concave arc 76 joins the profile 78 of the inner thread portion 47' of thread 46 tangentially at 81, with a change of profile curvature. At 81 profile 78 is more curved than the arc 76. Its curvature radius there is smaller than the radius of the arc 76. Profiles 77 and 78 are curves of varying curvature.

More broadly, and referring not only to the circular arcuate profiles of the outer thread portions, mating thread sides of the two screws consist each of two different kinds of helical surfaces that join each other tangentially with a change of profile curvature. The outer portion occupies less than half the depth of the thread. The outer portions of the pair of screw rotors are adapted to mesh with each other with tangential contact in the manner of gears. One has a convex profile while its mate has a concave profile. Their line of contact connects the essentially helical sealing lines at the outside ends of the thread. It truncates the general V-shape of these lines.

The novel thread shape may be produced in any suitable known way, as for instance, by milling or grinding. Preferably the outer and inner thread shapes are simultaneously produced with a single cutter or wheel. The cutting profile of this tool is then also composed of two different portions that join tangentially with a change of profile curvature, as is readily understood.

Fig. 3 shows a structure somewhat different from that illustrated in Fig. 2. 22' denotes the casing, 20' the central screw and 21a and 21b the two screws which mesh with screw 20'. Here a partition 35 is added at the higher pressure end of the screws. This partition will here be disposed at the left hand ends of the screw threads, as viewed in an axial section, such as that of Fig. 1, and to the right of the outlet 27, as viewed in such a section. Such partitions are well known in pumps for compressible fluids, such as air, gases, and any suitable known design may be used. Partition 35 is rigid with and may be integral with the casing 22'. It has openings 38 in it through which the fluid may flow to outlet 27.

On a blower or compressor such a partition provides gradual compression. The partition closes off the ends of the moving pockets except for the openings 38 in the partition. Thus, the volume of a pocket is reduced so as to conform to the required compression. The thus compressed air or gas then enters the outlet 27.

The partition covers up the thread ends which are indicated in dotted lines in Fig. 3. The central screw 20' may rotate in the direction of the arrow 36 and is shown in a turning position whereby pockets 37 in screw 20' have just opened up, after having previously been reduced in volume.

On a compressed air motor or other motor, using a gaseous medium, the compressed medium enters the pockets of reduced volume, and then expands in the pocket of increasing volume after it is sealed off by the partition. It thereby drives the rotor screws.

While the invention has been described in connection with particular embodiments thereof, it will be understood that it is capable of further modification; and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth, and as fall within the scope of the invention or the limits of the appended claims.

Having thus described my invention, what I claim is:

1. A rotary screw unit for displacing fluid comprising a casing, at least two interengaging externally threaded screws rotatably mounted in said casing, each screw having helical thread sides composed of outer portions and of inner portions, the profiles of both of said portions being convex on one screw and concave on the mating screw, the outer portion of a thread side joining the inner portion of that thread side tangentially with a change of profile curvature, the outer portions of the convex thread sides being more curved than the inner portions of said convex thread sides at their junctures, and the outer portions of the concave thread sides being less curved than the inner portions of said concave thread sides at their junctures, the outer portion of each thread side of each of said screws occupying less than half the depth of a thread side, and the outer portions of the thread sides of the two screws meshing with one another with tangential contact in the manner of gear teeth, so that at each point of contact the mating outer thread portions have a common tangent plane so that said outer portions are capable of transmitting driving contact one of said screws being the driver and the other the driven member, and said driven member being driven from said driver solely by the interengagement of their thread sides, without timing gears.

2. A rotary screw unit for displacing fluid comprising a casing, at least two interengaging externally threaded screws rotatably mounted in said casing, each screw having helical thread sides composed of outer portions and of inner portions, the profiles of both of said portions being convex on one screw and concave on a screw interengaging therewith, the outer portion of a thread side joining the inner portion of that thread side tangentially with a change of profile curvature, the outer portions of the convex thread sides being more curved than the inner portions of said convex thread sides at their junctures, and the outer portions of the concave thread sides being less curved than the inner portions of said concave thread sides at their junctures the outer portion of each said thread side of each screw occupying less than half the depth of a thread side, the inner portions of mating thread sides being shaped to engage in edge contact with the outside helices of the interengaging screws to effect sealing lines therewith, said sealing lines converging toward a point at the intersection of the outside surfaces of the interengaging screws, the outer portions of the mating thread sides having tangential contact with one another along a sealing line cutting off and bridging said sealing lines effected by the inner portions of the mating thread sides, said tangential contact enabling said outer portions to transmit driving pressure while also providing a sealing-line portion, whereby the composite sealing lines have generally truncated V-shape, said threads and the casing forming fluid-pockets bounded by the composite sealing lines.

3. A rotary screw unit for displacing fluid, comprising a casing, at least two interengaging screws rotatably mounted in said casing, each screw having helical thread sides, each side being composed of an outer portion and of an inner portion which joins said outer portion tangentially, said outer portions occupying less than half of the depth of the threads, said screws and the casing forming fluid-pockets bounded by sealing lines, said inner portions being shaped to engage in edge contact with the outside helices of the interengaging screws to effect sealing lines converging towards a point at the intersection of the extended outside surfaces of the interengaging screws, the outer portions of the thread sides of the two screws having, respectively, convex and concave circular arcuate shapes which engage each other in tangential contact in the manner of gears, the outer portions of the thread sides, which have convex circular arcuate outer portions, being more curved than the inner portions of the said thread sides at their junctures, and the outer portions of the thread sides, which have concave circular arcuate outer portions, being less curved than the inner portions of the latter thread sides at their junctures, and the line of contact of mating convex and concave outer portions effecting a bridge between two helical sealing lines in the vicinity of said point.

4. A rotary screw unit for displacing fluid, comprising a casing, at least two interengaging screws rotatably mounted in said casing, each screw having helical thread sides, each side being composed of an outer portion and of an inner portion which joins said outer portion tangentially, said outer portions occupying less than half of the depth of the threads, one of said screws having outer portions lying in the outside surface of a helical tube such as may be enveloped by a sphere whose center moves along a helix about the axis of said one screw, and the other of said screws having outer portions lying on the inside surface of a helical tube such as may be enveloped by a sphere whose center moves along a helix about the axis of said other screw, the outer portions of said screws engaging with tangential contact, the outer portions of the thread sides, which have outer portions lying in the outside surface of the first-named helical tube, being more curved than the inner portions of the said thread sides at their junctures, and the outer portions of the thread sides, which have outer portions lying in the inside surface of the second-named helical tube, being less curved than the inner portions of the latter thread sides at their junctures.

5. A rotary screw for displacing fluid, comprising a casing, at least two interengaging screws rotatably mounted in said casing, each of said screws having helical thread sides composed, at least on the side that is in driving contact with the other screw, of outer portions and of inner portions joining said outer portions tangentially, said inner portions having a varying profile curvature, said outer portions occupying less than half the depth of the threads, mating outer portions having convex and concave circular arcuate profiles, respectively, in normal sections perpendicular to the helix containing the centers of the arcuate profiles, the radii of said convex and concave profiles being approximately equal, the outer portions of the thread sides, which have convex circular arcuate outer profiles, being more curved than the inner portions of the said thread sides at their junctures, and the outer portions of the thread sides, which have concave circular arcuate outer profiles, being less curved than the inner portions of the latter thread sides at their junctures.

6. A rotary screw unit for displacing fluid, comprising a casing, at least two interengaging externally threaded screws rotatably mounted in said casing, each of said screws having helical thread sides composed of outer portions and of inner portions joining said outer portions tangentially with an abrupt change of profile curvature, said outer portions occupying less than half the depth of said threads and being provided on both sides of the threads on both screws, the outer portions of said two screws having convex and concave profiles, respectively, meshing with tangential contact in the manner of gears thereby to transmit driving pressure, the outer portions of the thread sides, which have convex outer profiles, being more curved than the inner portions of the said thread sides at their junctures, and the outer portions of the thread sides, which have concave outer profiles, being less curved than the inner portions of the latter thread sides at their junctures.

7. A rotary screw unit for displacing fluid, comprising a casing, at least two interengaging screws rotatably mounted in said casing, each of said screws having helical thread sides composed of outer portions and of inner portions joining said outer portions tangentially with an abrupt change of profile curvature, said outer portions occupying less than half the depth of said threads, the outer portions of said two screws having profiles of equal length and of convex and concave shape, respectively, and engaging in tangential contact with each other thereby to transmit driving pressure, the outer portions of the thread sides, which have convex outer portions, being more curved than the inner portions of the said thread sides at their junctures, and the outer portions of the thread sides, which have concave outer portions, being less curved than the inner portions of the latter thread sides at their junctures.

8. A rotary screw unit for displacing fluid, comprising a casing, at least two interengaging screws rotatably mounted in said casing, each of said screws having helical thread sides composed of outer portions and of inner portions joining said outer portions tangentially with a change of profile curvature, said outer portions occupying less than half the depth of said threads, one of said screws having outer portions of convex circular arcuate profile shape in a normal section, the other screw having outer portions of concave circular arcuate profile shape in a normal section, the outer portions of said two screws engaging in tangential contact, the radii of said convex and concave profiles being approximately equal and being at least as large as the pitch radius of the screw with convex outer profiles, the outer portions of the thread sides, which have convex outer portions, being more curved than the inner portions of the said thread sides at their junctures, and the outer portions of the thread sides, which have concave outer portions, being less curved than the inner portions of the latter thread sides at their junctures.

9. A rotary screw unit for displacing liquid, comprising a casing, at least two interengaging screws rotatably mounted in said casing, each of said screws having helical thread sides composed of outer portions and of inner portions joining said outer portions tangentially with change of profile curvature, said outer portions occupying less than half the depth of the threads, said screws and the casing forming fluid-pockets bounded by sealing lines, said inner portions being shaped to engage in edge contact with the outside helices of the interengaging screws to effect sealing lines, said sealing lines converging toward a point at the intersection of the extended outside surfaces of the screws, and said outer portions of the two screws being mating concave and convex surfaces, respectively, having tangential contact along a line bridging said sealing lines, whereby the composite sealing lines are of truncated V-shape, the distance of said bridging line from said point being less than half the depth of the threads, the outer portions of the thread sides, which have convex outer portions, being more curved than the inner portions of the said thread sides at their junctures, and the outer portions of the thread sides, which have concave outer portions, being less curved than the inner portions of the latter thread sides at their junctures.

10. A rotary screw unit for displacing fluid, comprising a casing, two interengaging screws mounted in said casing for rotation on parallel axes, each of said screws having helical thread sides composed, at least on the side that is in driving contact with the other screw, of outer portions and of inner portions joining said outer portions tangentially with an abrupt change in profile curvature, said outer portions occupying less than half the depth of the threads, the outer portions of one screw mating with the outer portions of the other screw, mating outer portions having convex and concave profile shapes, respectively, in normal sections, the outer portions of the thread sides, which have convex outer portions, being more curved than the inner portions of said thread sides at their junctures, and the outer portions of the thread sides, which have concave outer portions, being less curved than the inner portions of the latter thread sides at their junctures.

11. A rotary screw unit for displacing fluid, comprising a casing, at least two interengaging screws rotatably mounted in said casing, each of said screws being externally threaded and having helical thread sides composed of outer portions and inner portions, said outer portions joining said inner portions tangentially, said outer portions occupying less than half the depths of said threads, the profiles of the inner portions of both said screws being cycloids, one of said screws having outer portions which are of convex circular arcuate profile shape, and the other of said screws having outer portions which are of concave arcuate profile shape and which have a radius of curvature at least as large as the radius of curvature of the mating convex outer portions of said one screw, and the outer portions of the two screws engaging in tangential contact.

References Cited in the file of this patent

UNITED STATES PATENTS

| Number | Name | Date |
|---|---|---|
| 630,648 | Brewer | Aug. 8, 1899 |
| 960,993 | Motsinger | June 7, 1910 |
| 1,601,750 | Wildhaber | Oct. 5, 1926 |
| 1,698,802 | Montelius | Jan. 15, 1929 |
| 1,708,891 | Montelius | Apr. 9, 1929 |
| 1,821,523 | Montelius | Sept. 1, 1931 |
| 1,861,155 | Douglas | May 31, 1932 |
| 1,965,557 | Montelius | July 3, 1934 |
| 2,079,083 | Montelius | May 4, 1937 |
| 2,100,560 | Kennedy | Nov. 30, 1937 |
| 2,174,522 | Lysholm | Oct. 3, 1939 |
| 2,188,702 | Burghauser | Jan. 30, 1940 |
| 2,198,786 | Montelius | Apr. 30, 1940 |
| 2,473,234 | Whitfield | June 14, 1949 |
| 2,581,451 | Sennet | Jan. 8, 1952 |
| 2,588,888 | Sennet | Mar. 11, 1952 |
| 2,590,560 | Montelius | Mar. 25, 1952 |
| 2,622,787 | Nilsson | Dec. 23, 1952 |
| 2,693,762 | Sennet | Nov. 9, 1954 |
| 2,693,763 | Sennet | Nov. 9, 1954 |
| 2,868,442 | Nilsson | Jan. 13, 1959 |